US010015823B2

(12) United States Patent
Ohuchi et al.

(10) Patent No.: US 10,015,823 B2
(45) Date of Patent: Jul. 3, 2018

(54) MOBILE STATION APPARATUS, BASE STATION APPARATUS, INTEGRATED CIRCUIT, AND METHOD OF DETECTING RANDOM ACCESS PROBLEMS

(71) Applicant: SHARP KABUSHIKI KAISHA, Osaka-shi, Osaka (JP)

(72) Inventors: Wataru Ohuchi, Osaka (JP); Shohei Yamada, Osaka (JP); Yasuyuki Kato, Osaka (JP); Daiichiro Nakashima, Osaka (JP); Katsunari Uemura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/064,473

(22) Filed: Mar. 8, 2016

(65) Prior Publication Data

US 2016/0262187 A1   Sep. 8, 2016

Related U.S. Application Data

(63) Continuation of application No. 13/255,968, filed as application No. PCT/JP2010/052325 on Feb. 17, 2010, now abandoned.

(30) Foreign Application Priority Data

Mar. 13, 2009 (JP) ................. 2009-060436

(51) Int. Cl.
*H04W 24/00* (2009.01)
*H04W 74/08* (2009.01)
(Continued)

(52) U.S. Cl.
CPC ..... *H04W 74/0833* (2013.01); *H04L 61/6022* (2013.01); *H04W 24/08* (2013.01); *H04W 72/0413* (2013.01); *H04W 88/02* (2013.01)

(58) Field of Classification Search
CPC ............. H04W 74/0833; H04W 24/08; H04W 72/0413; H04W 88/02; H04L 61/6022
See application file for complete search history.

(56) References Cited

U.S. PATENT DOCUMENTS

2004/0071194 A1*  4/2004  Suwa ................. H04L 1/08
                                                  375/146
2007/0064665 A1   3/2007  Zhang et al.
(Continued)

FOREIGN PATENT DOCUMENTS

JP   2008-079192 A    4/2008
JP   2009-506643 A    2/2009
(Continued)

OTHER PUBLICATIONS

"3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.4.0, Dec. 2008, pp. 1-43.
(Continued)

*Primary Examiner* — Luat Phung
(74) *Attorney, Agent, or Firm* — Birch, Stewart, Kolasch & Birch, LLP

(57) ABSTRACT

A terminal device includes a transmitter that transmits a random access preamble, a higher layer processor that configures, based on a higher layer signal, a first identity corresponding to a first component carrier group and a second identity corresponding to a second component carrier group; a counter that, in a case that two or more component carriers are configured for an uplink, counts a number of transmission of the random access preamble; and a medium access control (MAC) layer processor that indicates a random access problem to an upper layer in a case that the number exceeds a maximum number of transmission of the random access preamble on a master component carrier of
(Continued)

the first component carrier group or a master component carrier of the second component carrier group.

4 Claims, 9 Drawing Sheets

(51) Int. Cl.
  *H04W 24/08* (2009.01)
  *H04L 29/12* (2006.01)
  *H04W 72/04* (2009.01)
  *H04W 88/02* (2009.01)

(56) References Cited

U.S. PATENT DOCUMENTS

| | | |
|---|---|---|
| 2007/0147310 A1 | 6/2007 | Cai |
| 2009/0086673 A1* | 4/2009 | Aminaka et al. ..... H04W 72/04 370/329 |
| 2009/0305693 A1* | 12/2009 | Shimomura ........ H04W 74/004 455/422.1 |
| 2010/0118720 A1 | 5/2010 | Gauvreau et al. |
| 2010/0195507 A1* | 8/2010 | Marinier .................. H04L 1/20 370/242 |
| 2010/0290407 A1 | 11/2010 | Uemura |
| 2011/0021154 A1 | 1/2011 | Marinier et al. |
| 2011/0075629 A1 | 3/2011 | Seo et al. |
| 2011/0235609 A1 | 9/2011 | Ahn et al. |
| 2011/0286411 A1* | 11/2011 | Kim ...................... H04L 5/0007 370/329 |
| 2011/0317777 A1 | 12/2011 | Huang et al. |
| 2012/0002617 A1* | 1/2012 | Vujcic ................. H04W 74/002 370/329 |
| 2012/0008575 A1 | 1/2012 | Vujcic |

FOREIGN PATENT DOCUMENTS

| | | |
|---|---|---|
| WO | WO 03/041438 A1 | 5/2003 |
| WO | WO 2008/026461 A1 | 3/2008 |

OTHER PUBLICATIONS

CMCC, "Multicarrier Operation and PDCCH Design of Carrier Aggregation", 3GPP TSG RAN WG1 meeting #55, Prague, Czech Republic, Nov. 10-14, 2008, R1-084333, 4 pages, [retrieved on Mar. 16, 2015], URL:http://www.3gpp.org/ttp/tsg_ran/WG1_RL1/TSGR1_55/Docs/R1-084333.zip.
Ericsson, "Carrier aggregation in LTE-Advanced", TSG-RAN WG1 #53bis, R1-082468, Warsaw, Poland, Jun. 30-Jul. 4, 2008 (6 pages).
NTT DOCOMO, "Initial Access Procedure for Assymetric Wider Bandwidth in LTE-Advanced", 3GPP TSG RAN WG1 Meeting #56, R1-090897, Athens, Greece, Feb. 9-13, 2009 (5 pages).
Texas Instruments, "RACH Procedure for Assymetric Carrier Aggregation", 3GPP TSG RAN WG1 #56, R1-090583, Athens. Greece, Feb. 9-13, 2009 (4 pages).
ZTE, "Initial Uplink Access Procedure in LTE-Advanced", 3GPP TSG RAN WG1 Meeting #56, R1-090984, Athens, Greece, Feb. 9-13, 2009 (5 pages).
Final Office Action for copending U.S. Appl. No. 13/255,968, dated Dec. 5, 2013.
Final Office Action for copending U.S. Appl. No. 13/255,968, dated Nov. 13, 2015.
Non-Final Office Action for copending U.S. Appl. No. 13/255,968, dated Jul. 17, 2015.
Non-Final Office Action for copending U.S. Appl. No. 13/255,968, dated May 9, 2013.

* cited by examiner

MOBILE STATION APPARATUS, BASE STATION APPARATUS, INTEGRATED CIRCUIT, AND METHOD OF DETECTING RANDOM ACCESS PROBLEMS

CROSS REFERENCE TO RELATED APPLICATIONS

This application is a Continuation of copending application Ser. No. 13/255,968, filed on Sep. 12, 2011, which was filed as PCT International Application No. PCT/JP2010/052325 on Feb. 17, 2010, which claims the benefit under 35 U.S.C. § 119(a) to Patent Application No. 2009-060436, filed in Japan on Mar. 13, 2009, all of which are hereby expressly incorporated by reference into the present application.

TECHNICAL FIELD

The present invention relates to a mobile station apparatus in a mobile communication system, and, more particularly, to a method of detecting a random access problem for multiple component carriers.

BACKGROUND ART

The standard-setting organization 3GPP (3rd Generation Partnership Project) is discussing Evolved Universal Terrestrial Radio Access (hereinafter, EUTRA) evolved from the third generation mobile communication method and an advanced version thereof, i.e., Advanced EUTRA (also referred to as LTE-Advanced).

In Advanced EUTRA, the SC-FDMA (Single Carrier-Frequency Division Multiple Access) method is proposed as the uplink communication method.

Processing of a medium access control layer related to random access is proposed in EUTRA (Nonpatent Literature 1).

In Advanced EUTRA, carrier aggregation (frequency band aggregation) is proposed as a technique enabling higher-speed data transmission while maintaining the compatibility with EUTRA (Nonpatent Literature 2). The carrier aggregation is a technique for improving a data rate in downlink communication by preparing a transmitting apparatus and a receiving apparatus that has a reception bandwidth greater than the transmission bandwidth of the transmitting apparatus, by transmitting data from multiple transmitting apparatuses to which multiple respective different frequency bands (hereinafter, component carriers (CC)) are set, and by receiving the data transmitted from the plurality of transmitting apparatuses in the receiving apparatus. The carrier aggregation is also a technique for improving a data rate in uplink communication by preparing a receiving apparatus and a transmitting apparatus that has a transmission bandwidth greater than the reception bandwidth of the receiving apparatus and by receiving data transmitted from the transmitting apparatus by multiple receiving apparatuses to which respective different frequencies are set bands.

PRIOR ART DOCUMENTS

Nonpatent Literatures

Nonpatent Literature 1: 3GPP TS36.321, Medium Access Control (MAC) protocol specification. V8.4.0 http://www.3gpp.org/ftp/Specs/html-info/36321.htm Nonpatent Literature 2: Ericsson, R1-082468, 3GPP TSG-RAN1 Meeting #53bis, Warsaw, Poland, Jun. 30-Jul. 4, 2008

SUMMARY OF THE INVENTION

Problem to be Solved by the Invention

However, if the carrier aggregation is applied in the uplink communication, an uplink channel transmitting method suitable for Advanced EUTRA must be examined since a mobile station apparatus uses multiple component carriers for transmission.

Particularly when a mobile station apparatus uses multiple component carriers for transmitting a signal, a problem of random access must appropriately be detected to appropriately execute processing related to communication connection.

When a mobile station apparatus uses multiple component carriers to transmit a random access channel, if the mobile station apparatus waits the completion of random access procedures of all the component carriers and then detects a random access problem to execute reestablishment processing, a time until uplink data transmission is wasted. To prevent such a waste, a means for promptly detecting a random access problem and promptly executing reestablishment processing is necessary for the mobile station apparatus.

The present invention was conceived to solve the problem and it is therefore an object of the present invention to provide a mobile station apparatus, a base station apparatus, an integrated circuit, and a detecting method of a random access problem capable of detecting a random access problem in multiple component carriers by using one random access channel transmission counter (counter for counting the number of transmissions of a random access channel).

Means for Solving the Problem

A mobile station apparatus of one aspect of the present invention is characterized by using a counter for multiple component carriers to mange a random access procedure.

A first technical means of one aspect of the present invention is a random access problem detecting method of a mobile station apparatus using multiple component carriers that are usable frequency bands to communicate with a base station apparatus, wherein the mobile station apparatus at least comprises the steps of: setting one counter for counting the number of transmissions of a random access channel to a master component carrier specified by the base station apparatus; transmitting the random access channel to the base station apparatus; counting the number of transmissions of the random access channel transmitted by the counter using the master component carrier; and recognizing that a random access problem is detected for all the component carriers if the number of transmissions reaches a predetermined maximum number of transmissions.

A second technical means of one aspect of the present invention is the random access problem detecting method as defined in the first technical means, wherein the master component carrier is an uplink component carrier that is paired with a downlink component carrier that the mobile station apparatus accesses first.

A third technical means of one aspect of the present invention is the random access problem detecting method as defined in the first technical means, wherein the master component carrier is an uplink component carrier that is paired with a downlink component carrier having a highest priority specified with broadcast information transmitted from the base station apparatus.

A fourth technical means of one aspect of the present invention is a random access problem detecting method of a mobile station apparatus using multiple component carriers that are usable frequency bands to communicate with a base station apparatus, wherein the mobile station apparatus at least comprises the steps of: setting a counter for counting the number of transmissions of a random access channel one-by-one to each of the plurality of component carriers; transmitting the random access channel to the base station apparatus; counting the number of transmissions of the random access channel transmitted by the counter using the component carriers; and recognizing that a random access problem is detected if all the numbers of transmissions for the plurality of component carriers reach a predetermined maximum number of transmissions.

A fifth technical means of one aspect of the present invention is a random access problem detecting method of a mobile station apparatus using multiple component carriers that are usable frequency bands to communicate with a base station apparatus, wherein the mobile station apparatus at least comprises the steps of: forming multiple component carrier groups from the plurality of component carriers in accordance with information for forming the component carrier groups transmitted from the base station apparatus; setting a counter for counting the number of transmissions of a random access channel one-by-one to each of the plurality of component carrier groups; transmitting the random access channel to the base station apparatus; counting the number of transmissions of the random access channel by the counter; and recognizing that a random access problem is detected if all the numbers of transmissions for the component carrier groups reach a predetermined maximum number of transmissions.

A sixth technical means of one aspect of the present invention is the random access problem detecting method as defined in the fifth technical means, at least comprises the step of setting a master component carrier for each of the component carrier groups.

A seventh technical means of one aspect of the present invention is the random access problem detecting method as defined in the sixth technical means, at least comprises the step of setting the counter to a master component carrier included in each of the component carrier groups.

An eighth technical means of one aspect of the present invention is a random access problem detecting method of a mobile station apparatus using multiple component carriers that are usable frequency bands to communicate with a base station apparatus, wherein the mobile station apparatus at least comprises the steps of: transmitting a random access channel to the base station apparatus; activating a timer for detecting a random access problem if the number of transmissions of the random access channel reaches a predetermined maximum number of transmissions; and recognizing that a random access problem is detected if the timer reaches a predetermined time.

A ninth technical means of one aspect of the present invention is a mobile station apparatus using multiple component carriers to communicate with a base station apparatus, wherein one counter for counting the number of transmissions of a random access channel is set to a master component carrier specified by the base station apparatus out of the plurality of component carriers, the random access channel is transmitted to the base station apparatus, the counter counts the number of transmissions of the random access channel transmitted using the master component carrier, and detection of a random access problem is recognized for all the component carriers if the number of transmissions reaches a predetermined maximum number of transmissions.

A tenth technical means of one aspect of the present invention is the mobile station apparatus as defined in the ninth technical means, wherein the master component carrier is an uplink component carrier that is paired with a downlink component carrier that the mobile station apparatus first accesses.

An eleventh technical means of one aspect of the present invention is the mobile station apparatus as defined in the ninth technical means, wherein the master component carrier is an uplink component carrier that is a paired with a downlink component carrier having a highest priority specified with broadcast information transmitted from the base station apparatus.

A twelfth technical means of one aspect of the present invention is a mobile station apparatus using multiple component carriers to communicate with a base station apparatus, wherein a counter for counting the number of transmissions of a random access channel one-by-one is set to each of the plurality of component carriers, the random access channel is transmitted to the base station apparatus, the counter counts the number of transmissions of the random access channel transmitted using the component carriers for each of the component carriers, and detection of a random access problem is recognized if all the numbers of transmissions reach a predetermined maximum number of transmissions.

A thirteenth technical means of one aspect of the present invention is a mobile station apparatus using multiple component carriers to communicate with a base station apparatus, wherein multiple component carrier groups are formed from the plurality of component carriers in accordance with information for forming the component carrier groups transmitted from the base station apparatus, a counter for counting the number of transmissions of a random access channel one-by-one is set to each of the plurality of component carrier groups; the random access channel is transmitted to the base station apparatus, the counter counts the number of transmissions of the random access channel transmitted from the component carrier groups for each of the component carrier group, and detection of a random access problem is recognized if all the numbers of transmissions reach a predetermined maximum number of transmissions.

A fourteenth technical means of one aspect of the present invention is a mobile station apparatus using multiple component carriers to communicate with abase station apparatus, wherein a random access channel is transmitted to the base station apparatus, the number of transmissions of the random access channel is counted, a timer for detecting a random access problem is activated if the number of transmissions reaches a predetermined maximum number of transmissions, and detection of a random access problem is recognized if the timer reaches a predetermined expiration time.

A fifteenth technical means of one aspect of the present invention is an integrated circuit, when mounted on a mobile station apparatus, making the mobile station apparatus implement multiple functions of: setting one counter for counting the number of transmissions of a random access channel to a master component carrier specified by a base station apparatus; transmitting the random access channel to the base station apparatus; counting the number of transmissions of the random access channel transmitted by the counter using the master component carrier; and recognizing that a random access problem is detected for all the component carriers if the number of transmissions reaches a predetermined maximum number of transmissions.

A sixteenth technical means of one aspect of the present invention is an integrated circuit, when mounted on a mobile station apparatus, making the mobile station apparatus implement multiple functions of: setting a counter for counting the number of transmissions of a random access channel one-by-one to each of multiple component carriers; transmitting the random access channel to the base station apparatus; counting the number of transmissions of the random access channel transmitted by the counter using the component carriers for each of the component carriers; and recognizing that a random access problem is detected if all the numbers of transmissions reach a predetermined maximum number of transmissions.

A seventeenth technical means of one aspect of the present invention is an integrated circuit, when mounted on a mobile station apparatus, making the mobile station apparatus implement multiple functions of: setting a counter for counting the number of transmissions of a random access channel one-by-one to each of multiple component carrier groups made up of multiple component carriers; transmitting the random access channel to the base station apparatus; counting the number of transmissions of the random access channel transmitted from the component carrier groups for each of the component carrier groups by the counter; and recognizing that a random access problem is detected if all the numbers of transmissions reach a predetermined maximum number of transmissions.

An eighteenth technical means of one aspect of the present invention is an integrated circuit, when mounted on a mobile station apparatus, making the mobile station apparatus implement multiple functions of: transmitting a random access channel to a base station apparatus; counting the number of transmissions of the random access channel; activating a timer for detecting a random access problem if the number of transmissions reaches a predetermined maximum number of transmissions; and recognizing that a random access problem is detected if the timer reaches a predetermined time.

Effects of the Invention

The present invention can provide a detecting method of a random access problem that arises when a mobile station apparatus uses multiple different component carriers to execute a random access procedure, and reestablishment processing can efficiently be executed.

The detecting method of a random access problem can be provided in the random access procedure using multiple component carriers.

Reestablishment processing can be provided in the case of a random access problem that occurred in the random access procedure using multiple component carriers.

MODES FOR CARRYING OUT THE INVENTION

Figure 1:
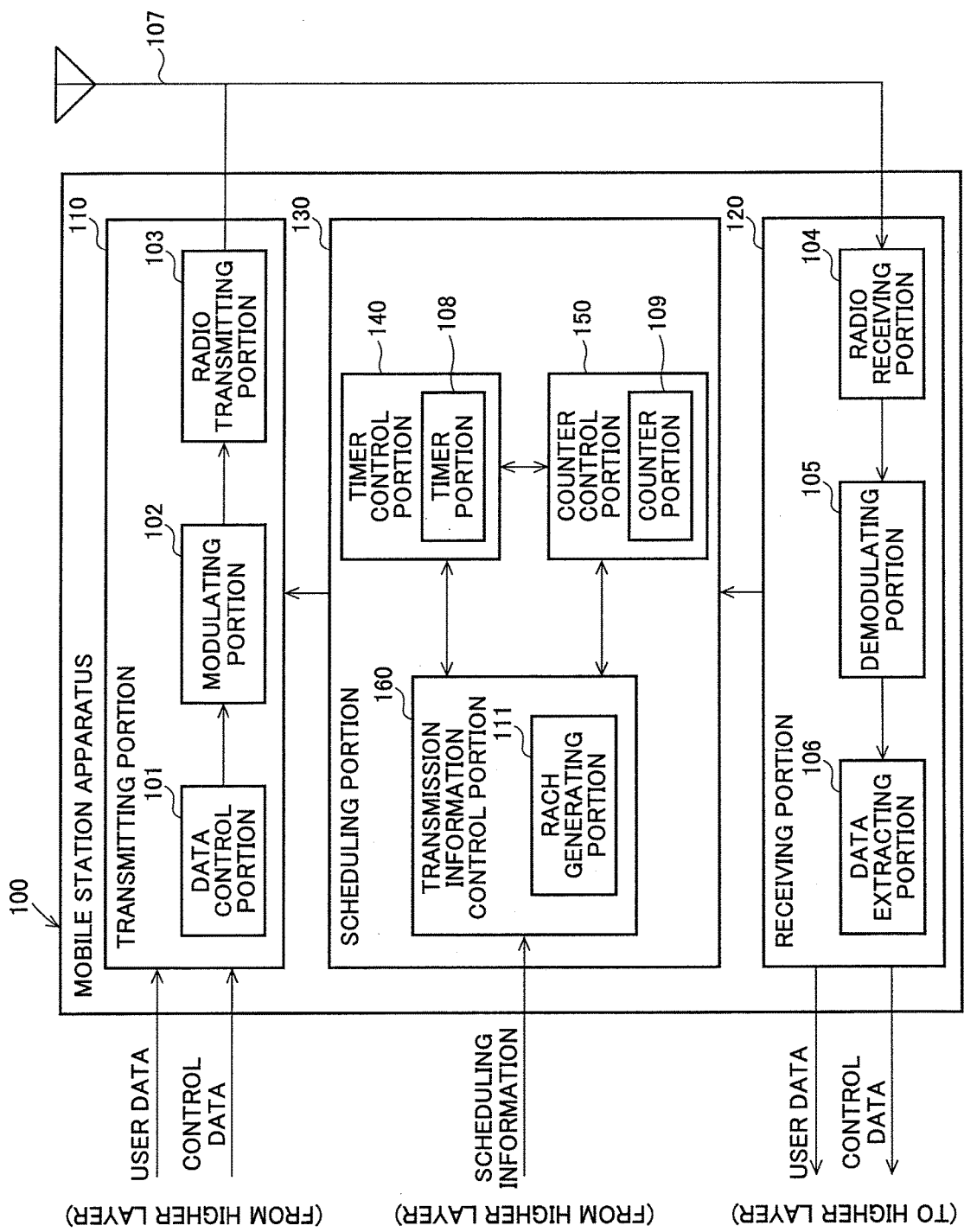
FIG. 1 is a block diagram of a general configuration of a mobile station apparatus according to a first embodiment of the present invention.

Before specifically describing embodiments, a summary of a communication technology used in the present invention will briefly be described.
(1) Interface Protocols of Layers Layers of a radio interface protocol between a mobile station apparatus and a network are classified into L1 (a first layer), L2 (a second layer), and L3 (a third layer) based on a reference model of Open System Interconnection (hereinafter, OSI).

A physical layer belongs to the first layer and uses a physical channel to provide information transmission service to a higher layer. The physical layer is coupled with a medium access control (hereinafter, MAC) layer of the second layer through a transport channel (also referred to as a transmission channel). Data is transmitted between the MAC layer and the physical layer through the transport channel.

The MAC layer belongs to the second layer and provides a service such as resource allocation between a logical channel and the transport channel to a radio link control (hereinafter, RLC) layer through the logical channel. The RLC layer assists reliable data transmission. The function of the RLC layer is implemented by a functional block in the MAC layer in some cases and, therefore, the RLC layer sometimes does not exist.

The second layer also includes a packet data convergence protocol (hereinafter, PDCP) layer along with the MAC layer and the RLC layer.

The PDCP layer enables efficient transmission through a radio link by compressing header information added to packet data and prevents lack of data by managing the order of packets.

A radio resource control (hereinafter, RRC) layer belongs to the third layer and controls transport channels and physical channels in relation to setting, resetting, and cancelling of a radio bearer. The RRC layer performs broadcasting etc., of system information and call information from a network to mobile station apparatuses and also performs the control of the first and second layers necessary for the broadcasting etc. The RRC layer also controls radio resources between a mobile station apparatus and a network.

(2) Physical Channels

The physical channels used in the present invention include a physical broadcast channel, a physical uplink data channel (PUSCH: Physical Uplink Shared Channel), a physical downlink data channel (PDSCH: Physical Downlink Shared Channel), a physical downlink control channel (PDCCH), a physical uplink control channel (PUCCH), a physical random access channel (PRACH), a downlink reference signal (DL-RS), an uplink reference signal (UL-RS), etc. Even if a different type physical channel is added to the physical channels, the physical channel is applicable to the embodiments of the present invention described later.

The physical broadcast channel (PBCH) is transmitted for the purpose of notification of control parameters (broadcast information) commonly used by mobile station apparatuses within a cell. For the broadcast information not supplied through the physical broadcast channel, the physical downlink control channel is used for notification of a resource and a physical downlink shared channel is used for the transmission. A cell global ID indicative of a cell-specific ID (identity) etc., are supplied as the broadcast information. In the PBCH, the broadcast channel (BCH) is mapped at intervals of 40 milliseconds. Blind detection is performed for the timing of 40 milliseconds in a mobile station apparatus. Therefore, explicit signaling is not transmitted to a mobile station apparatus for the presentation of the timing of the physical broadcast channel. A sub-frame including the physical broadcast channel (PBCH) can be decoded by itself (self-decodable).

A physical channel related to the embodiments of the present invention is mainly a random access channel and, therefore, other physical channels will not be described in detail or will briefly be described.

The physical downlink control channel (PDCCH) is a downlink channel transmitted from a base station apparatus to a mobile station apparatus and is commonly used for multiple mobile station apparatuses. The base station apparatus uses the downlink control channel for transmitting transmission timing information and scheduling information (uplink/downlink resource allocation information).

The physical downlink data channel (PDSCH: Physical Downlink Shared Channel) is a channel used for transmitting downlink data or paging information.

The downlink reference signal (DL-RS: Downlink Reference Signal or Cell-specific Reference Signal) is transmitted from a base station apparatus to a mobile station apparatus by utilizing a downlink channel. The mobile station apparatus measures the downlink reference signal to determine the reception quality of the downlink. The reception quality is supplied to a base station apparatus as a quality information indicator CQI (Channel Quality Indicator) by using the physical uplink control channel (PUCCH). The base station apparatus schedules downlink communication to mobile station apparatuses based on CQI supplied from the mobile station apparatuses.

SIR (Signal-to-Interference Ratio), SINR (Signal-to-Interference plus Noise Ratio), SNR (Signal-to-Noise Ratio), CIR (Carrier-to-Interference Ratio), BLER (Block Error Rate), path-loss, etc., can be used as the reception quality.

The physical uplink data channel (PUSCH: Physical Uplink Shared Channel) is a channel used mainly for transmitting uplink data (UL-SCH: Uplink Shared Channel). If a base station apparatus schedules a mobile station apparatus, the physical uplink data channel (PUSCH) is used for transmitting channel state information (the downlink channel quality indicator CQI, a precoding matrix indicator (PMI), a rank indicator (RI)), and an acknowledgement (ACK)/a negative acknowledgement (NACK) of a hybrid automatic repeat request (HARQ) for downlink transmission.

The uplink data (UL-SCH) indicates transmission of user data, for example, and UL-SCH is a transport channel. UL-SCH supports HARQ and dynamic adaptive radio link control and can utilize the beamforming. UL-SCH supports dynamic resource allocation and quasi-static resource allocation.

The physical uplink control channel (PUCCH) is a channel used for transmitting control data. The control data includes, for example, the channel state information (CQI, PMI, and RI) transmitted (fed back) from a mobile station apparatus to a base station apparatus, a scheduling request (SR) of a mobile station apparatus requesting allocation of resource for transmitting the uplink data (requesting transmission through UL-SCH), and ACK/NACK of HARQ for downlink transmission.

The uplink reference signal (UL-RS) is transmitted from a mobile station apparatus to a base station apparatus by utilizing an uplink channel. The base station apparatus measures the uplink reference signal to determine the reception quality of the uplink radio transmission signal of the mobile station apparatus. The base station apparatus schedules uplink communication based on the reception quality. The uplink reference signal is also used as a reference signal for calculating the variation of the amplitude, phase, and frequency of the uplink data channel to demodulate a signal transmitted by utilizing the uplink data channel.

The physical random access channel (PRACH) is a physical channel used for transmitting a random access preamble and has a guard time. The primary purpose of PRACH is to synchronize a mobile station apparatus with a base station apparatus and PRACH is also used for an initial access, a handover, a reestablishment request, and a scheduling request.

The random access channel (RACH) is a transport channel and is mapped on PRACH for transmission.

The physical random access channel (PRACH) uses code sequences orthogonal to each other and transmits these orthogonal code sequences to enable a base station apparatus to separate a radio signal if the orthogonal code sequence is different even when the uplink transmission timing is identical. The orthogonal code sequence is referred to as a signature and is used by a base station apparatus for identifying a mobile station apparatus. A signal made up of a signature is referred to as a random access preamble. The random access preamble includes a signal pattern indicative of information and several-bit information can be represented by preparing several tens of types of the random access preambles. It is currently assumed to transmit 6-bit information and it is assumed to prepare 64 types of the random access preambles. The 64 types of the random access preambles are classified into two groups (e.g., preamble groups A and B) based on broadcast information specified by a base station apparatus, and a mobile station apparatus determines which group of the random access preambles is selected, based on a path-loss and a message size of downlink. However, the number of allocations of the random access preambles configured to a group can freely be set.

Figure 3:
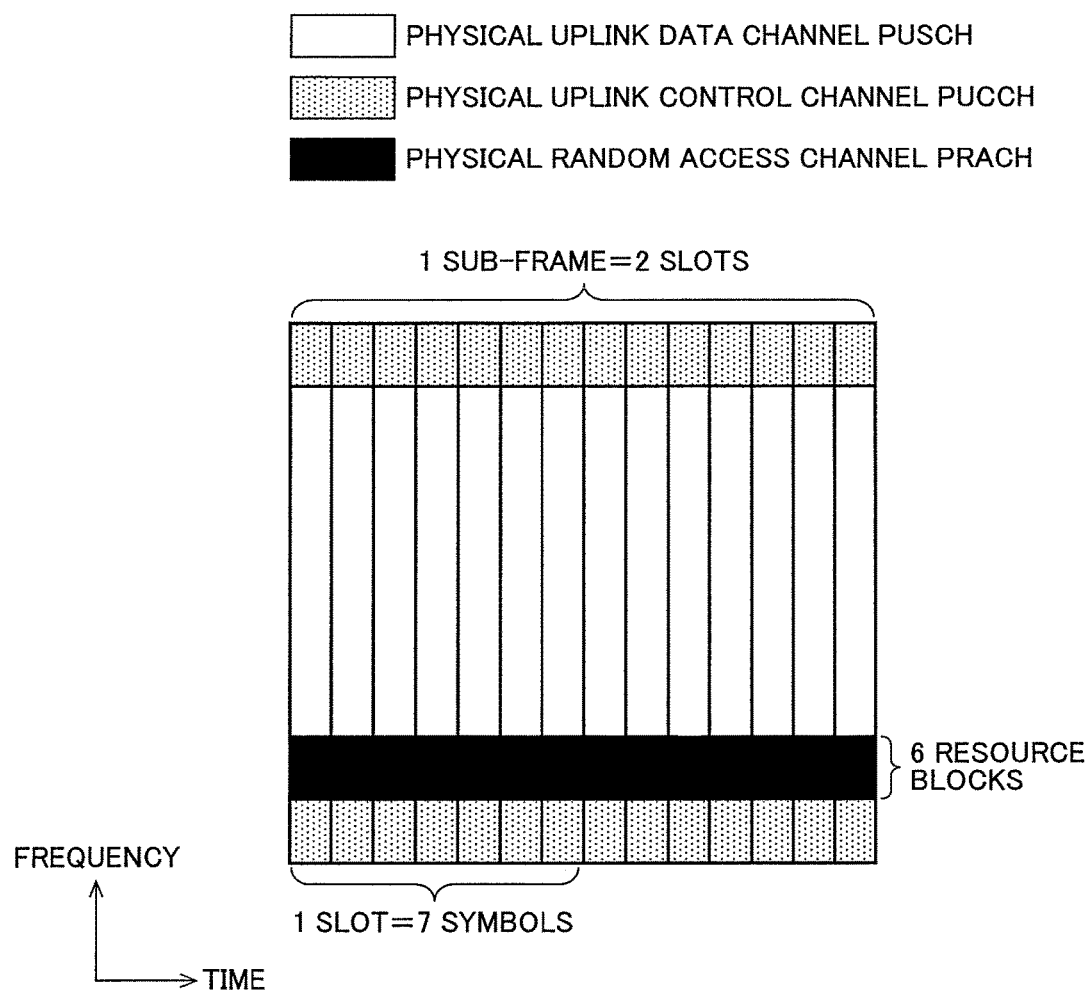
FIG. 3 is a diagram of a general configuration of uplink channels.

FIG. 3 is a diagram of a general configuration of the uplink channels. In FIG. 3, the horizontal axis indicates time and the vertical axis indicates frequency. In the time axis direction, 14 symbols are arranged. Seven symbols correspond to one slot and the length of one slot is 0.5 milliseconds (ms). 14 symbols (corresponding to two slots) correspond to one sub-frame and the length of one sub-frame is one millisecond. One resource block is made up of 12 sub-carriers and 7 symbols. Two resource blocks are used for allocating PUSCH to at least one mobile station apparatus. With regard to PRACH, six resource blocks are used as one physical random access channel and multiple PRACHs are prepared to deal with accesses from a number of mobile station apparatuses. As depicted, PUCCH is allocated in both the lowermost part (band closer to the lowest frequency) and the uppermost part (band closer to the highest frequency) in each bandwidth portion. PUSCH is allocated in an intermediate band located between those PUCCHs. PRACH is allocated and transmitted at a frequency position specified by the system information.

(3) Random Access Method

PRACH has access methods of contention-based random access and non-contention-based random access. The contention-based random access is random access having a possibility of a collision between mobile station apparatuses and is an access method of normally performed random access. On the other hand, the non-contention-based random access is random access not causing a collision between mobile station apparatuses and performed at the initiative of the base station apparatus in a special case such as a handover so as to rapidly achieve synchronization of uplink between the mobile station apparatus and the base station apparatus. If the base station apparatus is unable to drive the mobile station apparatus to perform the non-contention-based random access, the base station apparatus may drive the mobile station apparatus to perform the contention-based random access.

Only a random access preamble is transmitted through PRACH.

Figure 4:
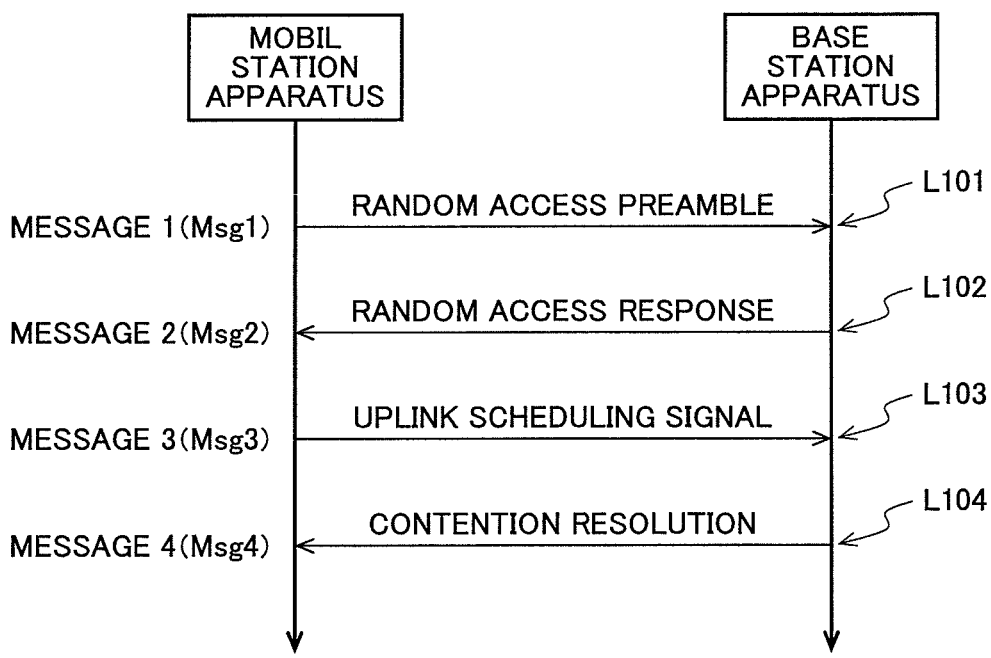
FIG. 4 is a diagram of an example of a procedure of contention-based random access.

FIG. 4 is a diagram of an example of a procedure of the contention-based random access. First, the mobile station apparatus selects a random access preamble from a random ID, downlink path-loss information, etc., and transmits the random access preamble through PRACH (message 1 (Msg1) (L101)).

When receiving the random access preamble from the mobile station apparatus, the base station apparatus calculates a gap of synchronizing timing between the mobile station and the base station from the random access preamble, performs scheduling for transmitting an L2/L3 message, assigns a temporary cell-radio network temporary identity (hereinafter, temporary C-RNTI), assigns RA-RNTI (Random Access-Radio Network Temporary Identity) in PDCCH to indicate that PDSCH includes a response to the mobile station apparatus that transmits the random access preamble, and transmits to PDSCH a random access response that includes synchronization timing gap information (timing advance), scheduling information, Temporary C-RNTI, and the random access preamble number (or random ID) of the received random access preamble (message 2 (Msg2) (L102)).

Different RA-RNTI is used for different PRACH.

When confirming that PDCCH has RA-RNTI, the mobile station apparatus checks the contents of the random access response assigned in PDSCH, extracts the response including the transmitted random access preamble number (or random ID), acquires the synchronization timing gap information to correct the uplink transmission timing, and uses a scheduled radio resource to transmit the L2/L3 message that at least includes C-RNTI (or a contention resolution ID (a random value for initial access or UEID (mobile station ID) such as s-TMSI (System Architecture Evolution-Temporary Mobile Subscriber Identity))) (message 3 (Msg3) (L103)).

When receiving the L2/L3 message from the mobile station apparatus, the base station apparatus uses the C-RNTI (or Temporary C-RNTI) included in the received L2/L3 message to transmit to the mobile station apparatus a contention resolution for determining whether a collision occurs between mobile station apparatuses (message 4 (Msg4) (L104)). If the contention resolution ID is transmitted through the message 3 (if the message 3 is a common control channel (CCCH)), the mobile station apparatus determines whether the random access processing is successful, depending on whether the contention resolution ID included in the L2/L3 message received through the contention resolution is identical to that transmitted by the mobile station apparatus. If C-RNTI is transmitted through the message 3, the mobile station apparatus detects C-RNTI through PDCCH from the base station apparatus to determine whether the random access processing is successful. With regard to the contention resolution, the mobile station apparatus ID (C-RNTI or contention resolution ID) is included in the message 3 (L2/L3 message) and transmitted to the base station apparatus, and the base station apparatus transmits to the mobile station apparatus the message 4 (contention resolution) as a response to the message 3. The base station apparatus includes and transmits the mobile station apparatus ID transmitted from the mobile station apparatus in the response to the message 3. The mobile station apparatus can confirm the access to the base station apparatus by confirming its own ID within the message 4.

If the mobile station apparatus fails to receive the message 2 or the contention resolution fails, the procedure is reattempted from the message 1.

(4) Random Access Problem

In order to connect to the base station apparatus, the mobile station apparatus transmits a random access preamble to the base station apparatus by randomly selecting the random access preamble or incorporating the random access preamble assigned in a network into a signal. If the mobile station apparatus fails in the line contention of the random access process because the transmitted RACH signal collides with another mobile station apparatus, because the base station apparatus cannot be distinguished due to excessively low transmission electric power etc., or because of the randomly selected random access preamble, or if a response to RACH (L102 and L104 of FIG. 4) is not returned from the base station apparatus in certain time, the mobile station apparatus retransmits RACH. The mobile station apparatus uses a random access channel transmission counter to count the number of RACH transmissions each time the mobile station apparatus transmits RACH. If the number of RACH transmissions exceeds a specified value (maximum number of transmissions), the MAC layer in the mobile station apparatus considers that a random access problem is detected, and notifies the RRC layer. When the RRC layer is notified of the random access problem by the MAC layer, the RRC layer considers that a radio link failure (hereinafter, RLF) occurs, and instructs a lower layer to execute a reestablishment processing such as changing a parameter of RACH and releasing a radio resource. The mobile station apparatus temporarily stops the transmission of RACH and the lower layer sets a new parameter and performs reestablishment based on the instruction. Even if the maximum number of transmissions of RACH is exceeded, the mobile station apparatus continues transmitting RACH with the same parameter to the base station apparatus until a new instruction is issued from a higher layer. A random access problem processing is defined herein as the processing until the reestablishment processing is executed after the random access problem is detected from the RACH transmission.

Embodiments of the present invention will now specifically be described in view of the matters described above. Component carriers (CCs) are respectively correlated in downlink and uplink, and RACH of a certain CC means RACH correlated with a certain downlink CC. Therefore, if multiple RACHs is allocated in one uplink CC and the RACHs are respectively correlated with different downlink CCs, the RACHs are interpreted as RACHs of different CCs.

First Embodiment

FIG. 1 is a block diagram of a general functional configuration of a mobile station apparatus 100 (first communicating apparatus) according to this embodiment. The mobile station apparatus 100 includes a transmitting portion 110, a receiving portion 120, a scheduling portion 130, and an antenna 107.

The transmitting portion 110 includes a data control portion 101, a modulating portion 102, and a radio transmitting portion 103.

The receiving portion 120 includes a radio receiving portion 104, a demodulating portion 105, and a data extracting portion 106.

The scheduling portion 130 includes a timer control portion 140, a counter control portion 150, and a transmission information control portion 160.

The timer control portion 140 includes a timer portion 108. The timer portion 108 has multiple timers set in advance. The timers include a timer with a purpose of use/application determined and a spare timer to which a new purpose of use can be assigned depending on system extension etc.

The counter control portion 150 includes a counter portion 109. The counter portion 109 has multiple counters set in advance. The counters include a counter with a purpose of use/application determined and a spare counter to which a new purpose of use can be assigned depending on system extension etc.

The transmission information control portion 160 includes an RACH generating portion 111.

User data and control data are input from a higher layer to the data control portion 101. The data control portion 101 assigns the input data in PUSCH or PUCCH in accordance with instructions from the scheduling portion 130. The uplink reference signal (UL-RS) is also assigned at this time. The modulating portion 102 modulates data and executes signal processing such as discrete Fourier transform (hereinafter, DFT), sub-carrier mapping, inverse fast Fourier transform (hereinafter, IFFT), CP (cyclic prefix) insertion, and filtering, to generate a transmission signal. The modulating portion 102 outputs the modulated signal to the radio transmitting portion 103.

The radio transmitting portion 103 up-converts the demodulated data to a radio frequency and then transmits the data to the base station apparatus via the antenna 107.

The radio receiving portion 104 receives and down-converts a downlink signal from the base station apparatus to a baseband signal to output the reception signal to the demodulating portion 105.

The demodulating portion 105 demodulates the reception data. The data extracting portion 106 divides the reception data into user data and control data. The data extracting portion 106 outputs the scheduling information, a random access response message, the control data related to intermittent reception control, and other control data of the second layer to the scheduling portion 130 and outputs the user data to the higher layer.

The scheduling portion 130 analyzes the control data input from the data extracting portion 106 and outputs the scheduling information and the scheduling information included in the random access response message to the transmission information control portion 160.

The transmission information control portion 160 instructs the data control portion 101 to allocate the user data and the control data to PUSCH and PUCCH in accordance with the scheduling information. The RACH generating portion 111 randomly selects a random access preamble number used for random access in accordance with instructions from the scheduling portion 130 and generates and outputs a random access preamble of the selected random access preamble number to the modulating portion 102.

The timer control portion 140 is used for adjusting the transmission timing between the mobile station apparatus and the base station apparatus, measures a time from signal transmission to a response to the signal, and measures a time corresponding to a purpose (such as a transmission time and a synchronization time) by using a different timer depending on a signal and CC to be measured. For example, the timer control portion 140 can measure a connection time between the mobile station apparatus and the base station apparatus in a radio communication system. If the timer reaches the expiration time, the mobile station apparatus considers that the mobile station apparatus and the base station apparatus cannot be connected and changes a parameter to attempt new connection.

The counter control portion 150 sets a transmission counter or a reception counter to a certain signal in a certain frequency band to count the number of transmissions or the number of receptions. For example, when it is desired to transmit PUSCH allocated to four CCs of CC#0 to CC#3 and to dispose a transmission counter in each of the CCs to count the number of transmissions, the counter control portion 150 selects and sets an arbitrary counter from the counter portion 109 to each of the CCs. In this patent, the counter control portion 150 sets a random access channel transmission counter for counting the number of transmissions of the random access channel transmitted from a certain CC.

Figure 2:
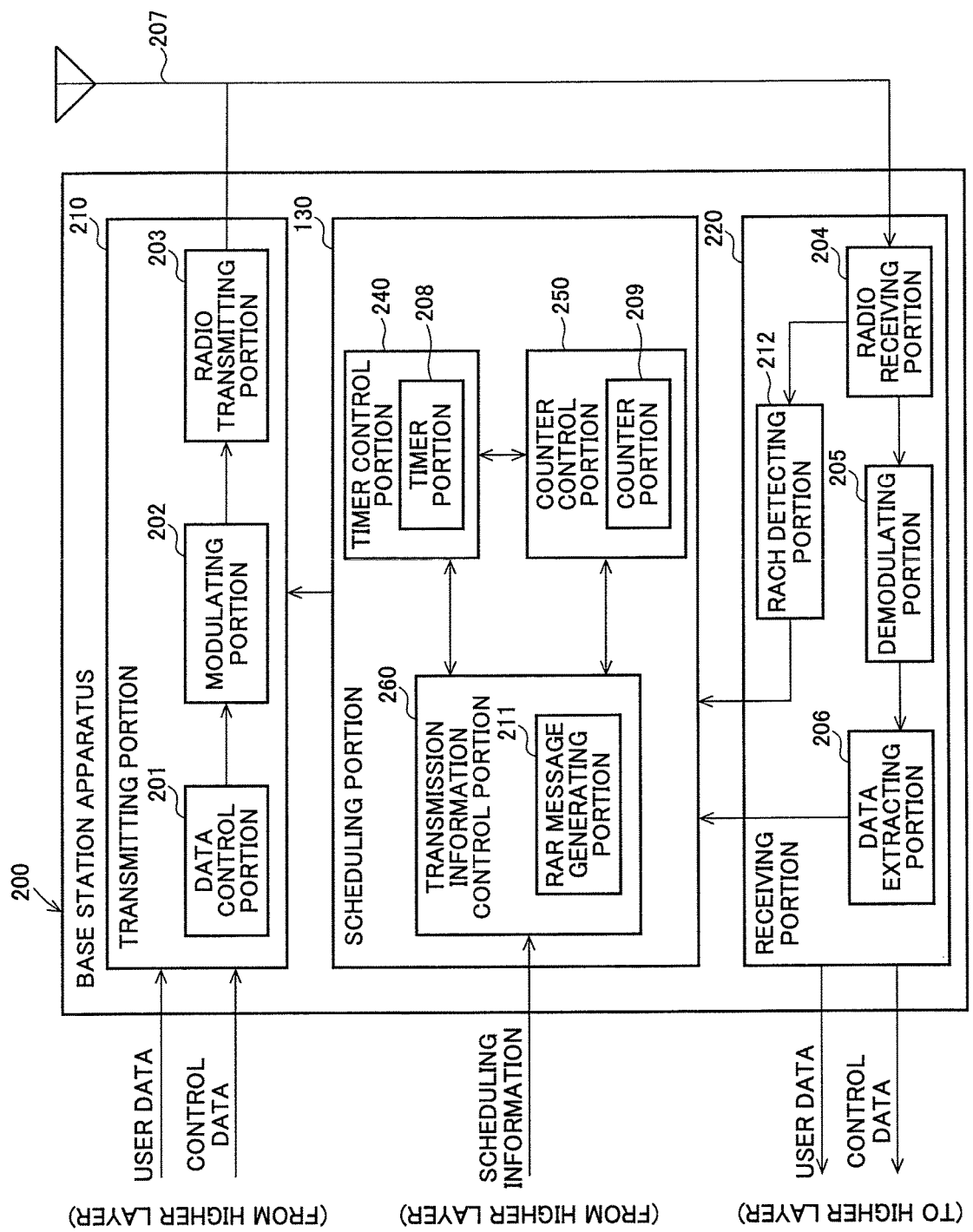
FIG. 2 is a block diagram of a general configuration of a base station apparatus according to the first embodiment of the present invention.

FIG. 2 is a block diagram of a general functional configuration of a base station apparatus 200 (second communicating apparatus) according to this embodiment. The base station apparatus 200 includes a transmitting portion 210, a receiving portion 220, a scheduling portion 230, and an antenna 207.

The transmitting portion 210 includes a data control portion 201, a modulating portion 202, and a radio transmitting portion 203.

The receiving portion 220 includes a radio receiving portion 204, a demodulating portion 205, a data extracting portion 206, and an RACH detecting portion 212.

The scheduling portion 230 includes a timer control portion 240, a counter control portion 250, and a transmission information control portion 260.

The timer control portion 240 includes a timer portion 208. The timer portion 208 has multiple timers set in advance. The timers include a timer with a purpose of use/application determined and a spare timer to which a new purpose of use can be assigned depending on system extension etc.

The counter control portion 250 includes a counter portion 209. The counter portion 209 has multiple counters set in advance. The counters include a counter with a purpose of use/application determined and a spare counter to which a new purpose of use can be assigned depending on system extension etc.

The transmission information control portion 260 includes a random access response (hereinafter, RAR) message generating portion 211.

The data control portion 201 inputs user data and control data, and maps the control data to PDCCH and the transmission data and the control data for mobile station apparatuses to PDSCH in accordance with instructions from the scheduling portion 230. The modulating portion 202 executes signal processing such as data modulation, serial/parallel conversion of an input signal, IFFT, CP insertion, and filtering, to generate a transmission signal. The radio transmitting portion 203 up-converts the demodulated data to a radio frequency and then transmits the data to the mobile station apparatus via the antenna 207.

The radio receiving portion 204 receives and down-converts an uplink signal from the mobile station apparatus to a baseband signal to output the reception data to the demodulating portion 205 and the RACH detecting portion 212.

The data extracting portion 206 checks whether the reception data is correct or incorrect and notifies the scheduling portion 230 of a result of the check. If the reception data is correct, the data extracting portion 206 divides the reception data into the user data and the control data. The data extracting portion 206 outputs control data of the second layer such as downlink CQI information and success/failure (ACK/NACK) of downlink data in the control data to the scheduling portion 230 and outputs other control data of the third layer etc., and the user data to the higher layer. If the reception data is incorrect, the data extracting portion 206 saves the data for combining with retransmission data and executes combining processing when receiving the retransmission data.

The scheduling portion 230 performs scheduling for mapping the user data and the control data to PDSCH and PDCCH.

The transmission information control portion 260 performs scheduling for mapping the user data to PUSCH based on a resource allocation request from the base station apparatus 100.

The RAR message generating portion 211 generates ACK/NACK from the correctness of the uplink reception data and a random access response message (corresponding to the message 2 of FIG. 4) from a detection result of the RACH detecting portion 212. The RACH detecting portion 212 detects a random access preamble, calculates a synchronization timing deviation amount, and reports the random access preamble number and the synchronization timing deviation amount to the scheduling portion 230.

The timer control portion 240 is used for adjusting the transmission timing between the mobile station apparatus and the base station apparatus, measures a time from signal transmission to a response to the signal, and measures a time corresponding to a purpose (such as a transmission time and a synchronization time) by using a different timer depending on a signal and CC to be measured. For example, the timer control portion 240 can measure a connection time between the mobile station apparatus and the base station apparatus in a radio communication system. If the timer reaches the expiration time, the base station apparatus considers that the mobile station apparatus and the base station apparatus cannot be connected and changes a parameter to attempt new connection.

The counter control portion 250 sets a transmission counter or a reception counter from the counter portion 209 for counting the number of transmissions or the number of receptions of a certain signal of a certain CC.

When the mobile station apparatus 100 selects multiple CCs to transmit RACH, one random access channel transmission counter counts the numbers of random access channel transmissions of all the CCs. Each time RACH is transmitted from the selected CC, the mobile station apparatus 100 counts the number of random access channel transmissions with the random access channel transmission counter and, if a predetermined maximum number of transmissions is reached, the MAC layer determines that a random access problem is detected, and notifies the RRC layer of the detection of the random access problem. The RRC layer considers that all of the plurality of CCs has RLF in response to the information, and stops the transmission of RACH to execute the reestablishment processing.

The mobile station apparatus selects multiple CCs. The transmission information control portion 160 instructs the RACH generating portion 111 to generate a random access preamble assigned to the CCs. The transmission information control portion 160 instructs the counter control portion 150 to set one counter for counting the number of transmissions of the random access channel transmitted by using the CCs. The counter control portion 150 arbitrarily sets a counter for counting the number of RACH transmissions from the counter portion 109.

Figure 5:
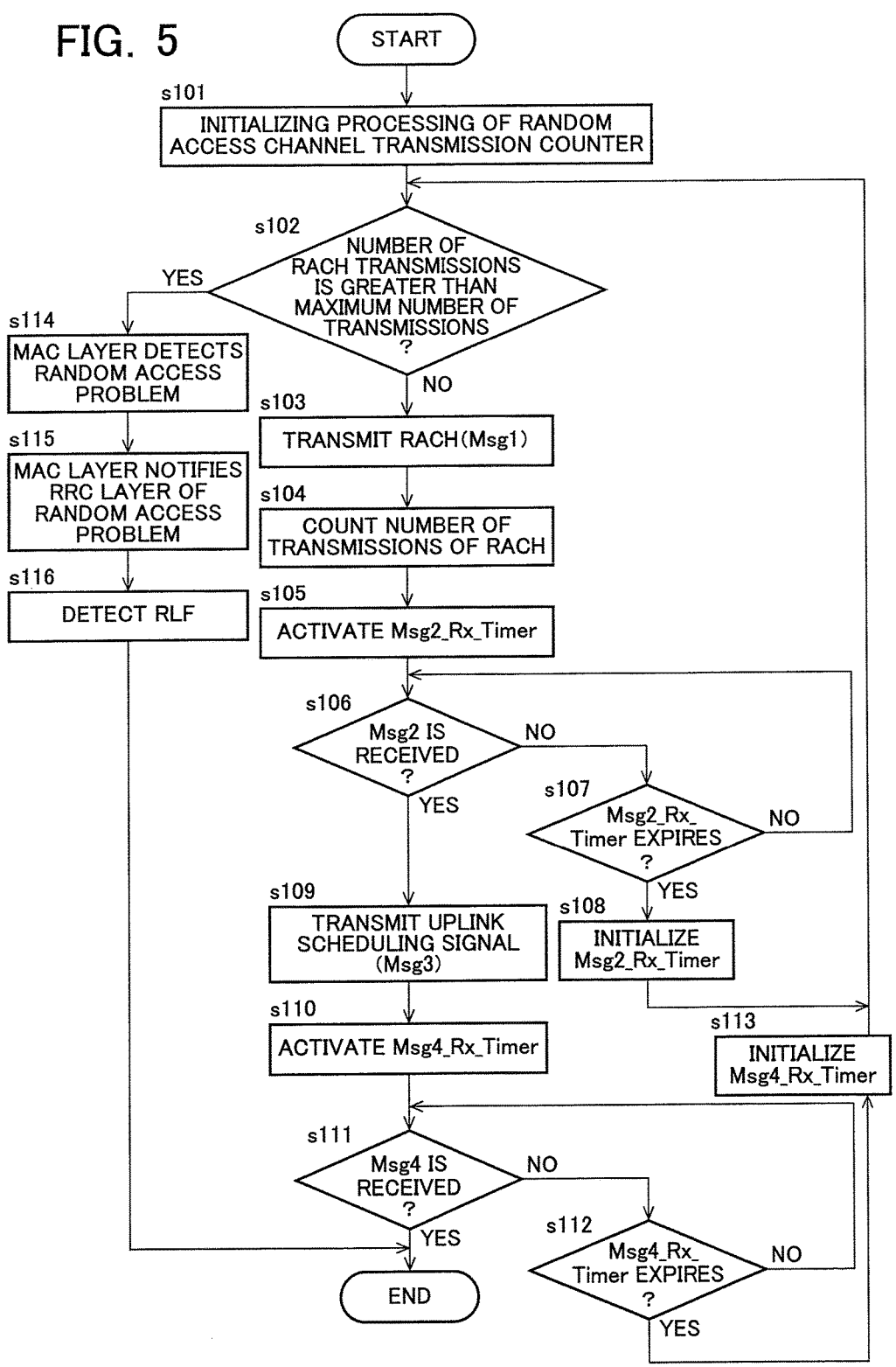
FIG. 5 is a flowchart of general processing for the mobile station apparatus performing the random access problem detection using a counter.

FIG. 5 is a general process flowchart of a random access procedure and a random access problem detecting method utilizing a random access channel transmission counter of this embodiment. The mobile station apparatus 100 sets the random access problem detecting method. Description will hereinafter be made in accordance with the procedure.

First, the mobile station apparatus 100 executes an initializing processing of the random access channel transmission counter (step s101). The mobile station apparatus 100 compares the current number of random access channel transmissions recorded in the random access channel transmission counter with the predetermined maximum number of random access channel transmissions (step s102). If the current number of random access channel transmissions is not greater than the predetermined maximum number of random access channel transmissions (step s102: NO), the mobile station apparatus 100 generates RACH (Msg1) in the RACH generating portion 111 based on an instruction from the transmission information control portion 160 so as to perform random access to the base station apparatus and transmits the RACH from the radio transmitting portion 103 via the antenna 107 to the base station apparatus 200 (step s103). The random access channel transmission counter counts the number of random access channel transmissions (step s104). The scheduling portion 130 instructs the timer control portion 140 to allocate and activate a message 2 reception timer (Msg2_Rx_Timer) from the timer portion 108 (step s105). The mobile station apparatus 100 continuously monitors the message 2 (step s106) until the message 2 reception timer reaches the expiration time (step s107). Before the mobile station apparatus 100 receives the message 2 (step s106: NO), if the message 2 reception timer reaches the expiration time (step s107: YES), the timer control portion 140 initializes the message 2 reception timer and restarts the random access procedure (step s108) from the transmission of RACH (Msg1) (step s102). If the message 2 is received (step s106: YES) before the message 2 reception timer reaches the expiration time (step s107: NO), the mobile station apparatus 100 generates anew uplink signal (Msg3) based on the scheduling information included in the message 2 and transmits the uplink signal from the radio transmitting portion 103 via the antenna 107 to the base station apparatus 200 (step s109). The scheduling portion 130 instructs the timer control portion 140 to allocate and activate a message 4 reception timer (Msg4_Rx_Timer) from the timer portion 108 (step s110). The mobile station apparatus 100 continuously monitors the message 4 (step s111) until the message 4 reception timer reaches the expiration time (step s112). Before the mobile station apparatus 100 receives the message 4 (step s111: NO), if the message 4 reception timer reaches the expiration time (step s112: YES), the timer control portion 140 initializes the message 4 reception timer and restarts the random access procedure (step s113) from the transmission of RACH (Msg1) (step s102). If the receiving portion 120 receives the message 4 (step s111: YES) before the message 4 reception timer reaches the expiration time (step s112: NO), the mobile station apparatus 100 considers that the ransom access to the base station apparatus 200 is successful, and terminates the random access procedure. The maximum number of transmissions of the random access channel may uniquely be determined in the system in advance, may concurrently be supplied as broadcast information from the base station apparatus to the mobile station apparatuses, or may be supplied from the base station apparatus to the individual mobile station apparatuses.

The case that the current number of random access channel transmissions is greater than the predetermined maximum number of random access channel transmissions (step s102: YES) will be described next.

The MAC layer of the mobile station apparatus 100 recognizes that a random access problem is detected (step s114) and notifies the RRC layer, i.e., the higher layer of the MAC layer of the random access problem (step s115). In response to the notification, the RRC layer recognizes that a radio link failure (RLF) is detected for the component carrier (CC) in which the random access problem is detected (step s116). The RRC layer releases the radio resource used for the RACH transmission and executes reestablishment processing. For example, the reestablishment processing includes changing a parameter such as a transmission frequency and restarting the random access procedure from step s101. However, the mobile station apparatus 100 continues transmitting RACH to the base station apparatus 200 until the RRC layer recognizes that RLF occurs (except step s102).

Figure 6:
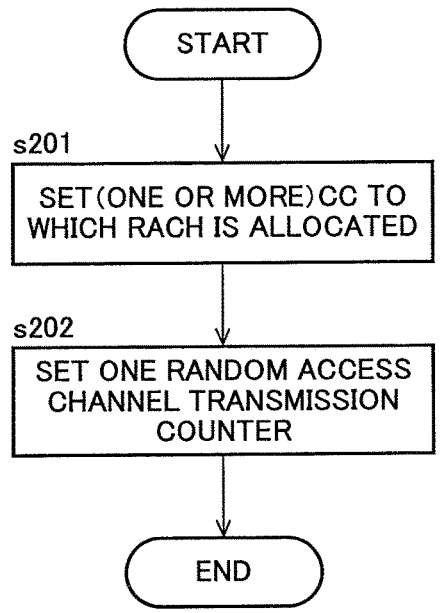
FIG. 6 is a flowchart of a setting method of a random access channel transmission counter of the first embodiment.

FIG. 6 is a flowchart of a setting method of the random access channel transmission counter of the first embodiment.

First, the mobile station apparatus 100 selects one or more CC to which RACH is allocated (step s201). The counter control portion 150 sets one counter (random access channel transmission counter) for counting the number of transmissions of RACH in the counter portion 109 (step s202). This counter counts the number of random access channel transmissions regardless of which CC transmits the RACH. The subsequent random access procedure is based on that of FIG. 5 and, therefore, the details will not be described.

In the first embodiment, one random access channel transmission counter manages the numbers of random access channel transmissions of all the selected CCs and, if the random access channel transmission counter reaches the maximum number of transmissions, it is recognized that the random access problem is detected and, therefore, the random access problem of all the selected CCs can be detected by one random access channel transmission counter. As a result, the mobile station apparatus can easily control the random access channel transmission counter.

Basic Form of Second Embodiment

A basic form of a second embodiment of the present invention will be described. The functional configuration of devices in the second embodiment is the same as that depicted in the first embodiment and will not be described.

When the mobile station apparatus selects multiple CCs to transmit RACH, any one CC is selected from the plurality of CCs and the random access channel transmission counter is set to the CC. Although CCs other than the CC having the random access channel transmission counter set may or may not perform the RACH transmission, the random access channel transmission counter does not count the number of transmissions if CCs other than the CC having the random access channel transmission counter set perform the RACH transmission. Each time RACH is transmitted from the CC, the mobile station apparatus counts the number of RACH transmissions with the random access channel transmission counter and, if a predetermined maximum number of transmissions is reached, the MAC layer notifies the RRC layer of the detection of the random access problem. The RRC layer considers that all of the plurality of CCs has RLF in response to the information, and stops the transmission of RACH to execute the reestablishment processing. However, if a random access response message is received for a CC other than the CC having the random access channel transmission counter set before the maximum number of transmissions is counted, the mobile station apparatus uses the CC to communicate with the base station apparatus.

Figure 7:
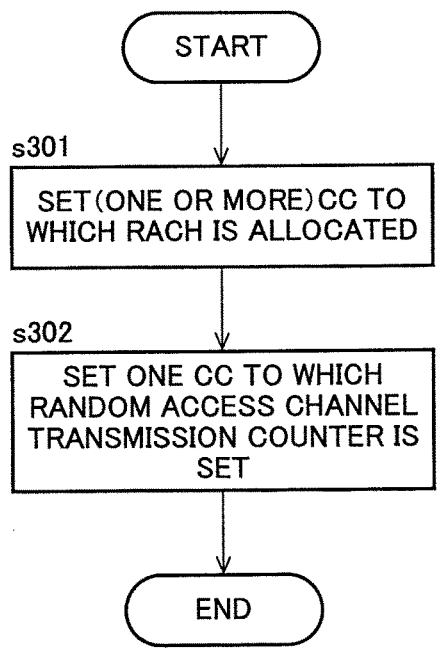
FIG. 7 is a flowchart of a setting method of a random access channel transmission counter in a basic form of a second embodiment.

FIG. 7 is a flowchart of a setting method of the random access channel transmission counter of the second embodiment.

First, the mobile station apparatus 100 selects one or more CC to which RACH is allocated (step s301). The counter control portion 150 sets one counter for counting the number of transmissions of RACH from the counter portion 109 (step s302). The mobile station apparatus 100 selects one CC to which the random access channel transmission counter is set (step s303). The random access channel transmission counter counts only the RACH transmission of this CC. The subsequent processing is the same as the first embodiment and will not be described.

In the basic form of the second embodiment, the mobile station apparatus selects one CC for setting the random access channel transmission counter from multiple CCs to detect the random access problem only for the one CC and, therefore, if multiple CCs are used for performing communication, the mobile station apparatus can easily control the random access channel transmission counter.

Variation of Second Embodiment

A variation of the second embodiment of the present invention will be described. The functional configuration of devices in the variation of the second embodiment is the same as that depicted in the first embodiment and will not be described.

The mobile station apparatus 100 selects an arbitrary CC from multiple CCs and uses only the CC to perform the random access procedure. Therefore, the mobile station apparatus 100 transmits RACH to the base station apparatus 200 only through the selected CC. The mobile station apparatus 100 sets the random access channel transmission counter only to the selected CC to detect the random access problem. Each time RACH is transmitted from the CC, the mobile station apparatus 100 counts the number of RACH transmissions with the random access channel transmission counter and, if the predetermined maximum number of transmissions is reached, the MAC layer notifies the RRC layer of the detection of the random access problem. The RRC layer considers that all of the plurality of CCs has RLF in response to the information, and stops the transmission of RACH to execute the reestablishment processing.

In the variation of the second embodiment, since the random access channel transmission counter is set only to the selected CC to detect the random access problem, the number of RACHs transmitted from the mobile station apparatus to the base station apparatus can be reduced to save electric power.

Third Embodiment

A third embodiment of the present invention will be described. The functional configuration of devices in the third embodiment is the same as that depicted in the first embodiment and will not be described.

When the mobile station apparatus uses multiple CCs to perform communication, the mobile station apparatus sets a master component carrier (hereinafter, M-CC). The mobile station apparatus uses only the M-CC to perform the RACH transmission. Each time RACH is transmitted from the M-CC, the mobile station apparatus counts with the random access channel transmission counter and, if the number of transmissions of the RACH reaches a predetermined maximum number of transmissions, the MAC layer notifies the RRC layer of the detection of the random access problem. The RRC layer considers that all of the plurality of CCs has RLF in response to the notification, and stops the transmission of RACH to execute the reestablishment processing. The master component carrier is an uplink component carrier that is paired with the downlink component carrier that the mobile station apparatus accesses first. Alternatively, the master component carrier is an uplink component carrier that is paired with the downlink component carrier individually specified to the mobile station apparatus by the base station apparatus using an RRC message. Alternatively, the master component carrier is an uplink component carrier that is paired with the downlink component carrier having the highest priority of downlink component carriers included in the broadcast information. Alternatively, the master component carrier is an uplink component carrier that is paired with the arbitrary downlink component carrier selected at the discretion of the mobile station apparatus out of the downlink component carriers received by the mobile station apparatus.

Figure 8:
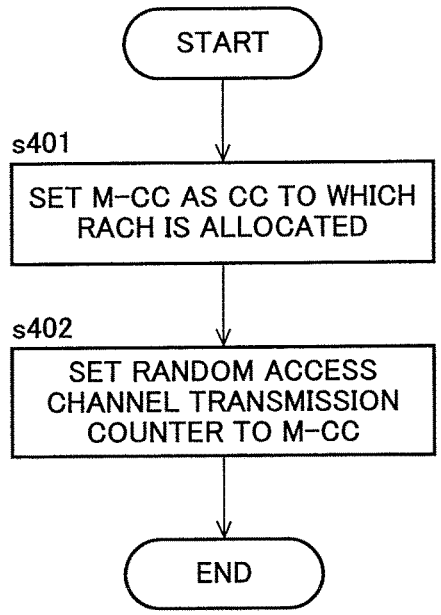
FIG. 8 is a flowchart of a setting method of a random access channel transmission counter of a third embodiment.

FIG. 8 is a flowchart of a setting method of the random access channel transmission counter of the third embodiment.

First, the mobile station apparatus 100 selects M-CC as CC to which RACH is allocated (if CC is already broadcasted by the base station apparatus, the CC is selected) (step s401). The mobile station apparatus 100 sets the random access channel transmission counter to the M-CC (step s402). The random access channel transmission counter counts only the RACH transmission of the M-CC. The subsequent processing is the same as the first embodiment and will not be described.

In the basic form of the third embodiment, since the RACH transmission is performed only through the M-CC, the radio resource used for RACH can be saved and, since the random access problem is detected only for the M-CC, electric power can be saved and the random access problem detection in multiple CCs can be simplified.

Fourth Embodiment

A fourth embodiment of the present invention will be described. The functional configuration of devices in the fourth embodiment is the same as that depicted in the first embodiment and will not be described.

If multiple CCs is selected to transmit RACH, the mobile station apparatus sets a random access channel transmission counter to each of the plurality of CCs to detect the random access problem for each CC.

Figure 9:
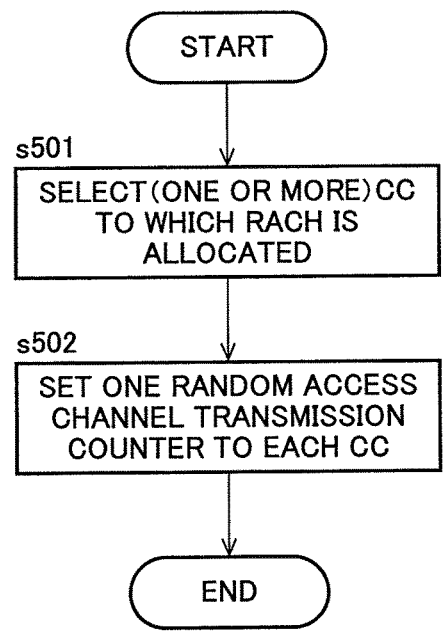
FIG. 9 is a flowchart of a setting method of a random access channel transmission counter of a fourth embodiment.

FIG. 9 is a flowchart of a setting method of the random access channel transmission counter of the fourth embodiment.

First, the mobile station apparatus 100 selects one or more CC to which RACH is allocated (step s501). The mobile station apparatus 100 drives the counter control portion 150 to set a counter for counting the number of transmissions of RACH (a random access channel transmission counter) from the counter portion 109 to the CC selected at step s501 (step s502). The random access channel transmission counter counts only the number of RACH transmissions of the CC to which the counter is set. A parameter (such as the maximum number of transmissions) of the random access channel transmission counters may be the same or different for each of CCs. The subsequent processing is the same as the first embodiment and will not be described.

If RACHs are concurrently transmitted through multiple different CCs, the mobile station apparatus 100 allocates different random access channel transmission counters among the CCs and detects the random access problem for each CC; however, if the random access channel is transmitted only one-by-one from the mobile station apparatus 100, a random access channel transmission counter can be reused for multiple CCs. For example, if the mobile station apparatus 100 sets a random access channel transmission counter to a certain CC and detects the random access problem in the CC, the mobile station apparatus 100 sets the random access channel transmission counter to another CC and counts the number of random access channel transmissions to detect the random access problem. However, if allocating to another CC, the mobile station apparatus 100 initializes the number of transmissions of the random access channel transmission counter.

In the fourth embodiment, since the random access problem is managed for each CC, if it is recognized that a certain CC has RLF and radio resource is released, an attempt to connect to the base station apparatus can be continued through another CC and a continuous access attempt can be made until the random access to the base station apparatus is completed.

Fifth Embodiment

A fifth embodiment of the present invention will be described. The functional configuration of devices in the fifth embodiment is the same as that depicted in the first embodiment and will not be described.

A component carrier making up a wide frequency band itself may be made up of multiple component carriers. In this embodiment, a component carrier made up of multiple component carriers will hereinafter be referred to as a component carrier group (CCG). In this embodiment, a wider system band (e.g., a system band having a bandwidth of 100 MHz) can be made up of two component carrier groups (e.g., a component carrier group (CCG-0) having a bandwidth of 40 MHz and a component carrier group (CCG-1) having a bandwidth of 60 MHz) and each of the two component carrier groups can further be made up of multiple component carriers (e.g., the component carrier group (CCG-0) having a bandwidth of 40 MHz can be made up by aggregating two component carriers (CC-0 and CC-1) each having a bandwidth of 20 MHz, and the component carrier group (CCG-1) having a bandwidth of 60 MHz can be made up by aggregating three component carriers (CC-2, CC-3, and CC-4) each having a bandwidth of 20 MHz). A component carrier and/or a component carrier group may be arranged in continuous frequency bands or in discontinuous frequency bands, and a wide system band can be made up by aggregating multiple component carriers and/or component carrier groups that are continuous and/or discontinuous frequency bands. A downlink frequency band (DL system band, DL system bandwidth) and an uplink frequency band (UL system band, UL system bandwidth) made up of component carriers and/or component carrier groups may not have the same bandwidth. If the DL system band and the UL system band have different bandwidths, the base station apparatus and the mobile station apparatus can use these frequency bands to perform communications.

The mobile station apparatus can manage the random access problem in the certain number of CCGs acquired by aggregating multiple CCs to apply the random access problem detecting methods of the first to fourth embodiments to each of the CCGs.

The mobile station apparatus can manage a different random access problem for each CCG.

Figure 10:
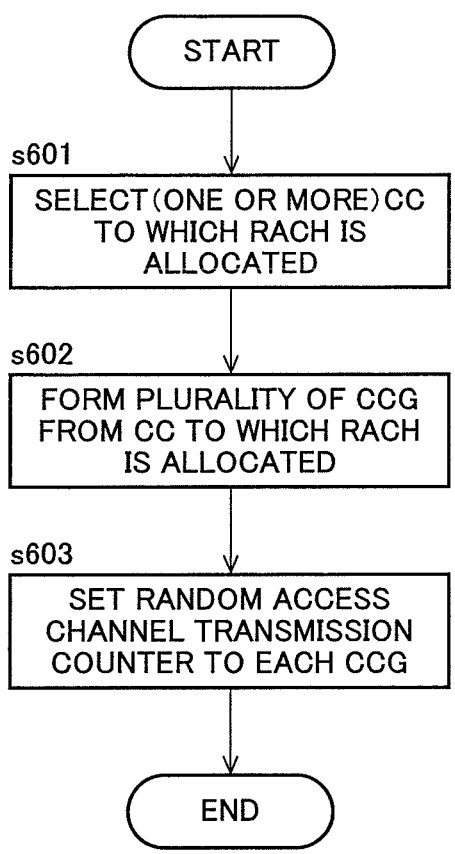
FIG. 10 is a flowchart of a setting method of a random access channel transmission counter of a fifth embodiment.

FIG. 10 is a flowchart of a setting method of the random access channel transmission counter in the fifth embodiment.

First, the mobile station apparatus 100 selects one or more CC to which RACH is allocated (step s601). The scheduling portion 130 allocates information (e.g., CCGID) for forming CCG to each CC to form multiple CCGs (in the case of one CCG, this is the same as the first to fourth embodiments) (step s602). The scheduling portion 130 applies any one of the first to fourth embodiments to each of the CCGs to count the number of random access channel transmissions (step s603). However, the setting method of the random access channel transmission counter may be the same or different for each of the CCGs. The subsequent processing is the same as the first embodiment and will not be described.

The information for forming CCG may uniquely be determined in the system in advance, may concurrently be supplied as broadcast information from the base station apparatus to the mobile station apparatuses, or may be supplied from the base station apparatus to the individual mobile station apparatuses.

In the fifth embodiment, since the setting methods of the random access channel transmission counter of the first to fourth embodiments are applicable to each COG, the random access problem can flexibly be detected. In other words, one component carrier can be selected in each of the component carrier groups to allocate a random access channel transmission counter to each component carrier. Alternatively, one master component carrier can be set in each of the component carrier groups to allocate a random access channel transmission counter to the master component carrier.

Sixth Embodiment

A sixth embodiment of the present invention will be described. The functional configuration of devices in the sixth embodiment is the same as that depicted in the first embodiment and will not be described.

The timer control portion 140 activates a random access problem detecting timer at the timing after the random access channel transmission counters of the first to fifth embodiments reach the maximum number of transmissions.

Figure 11:
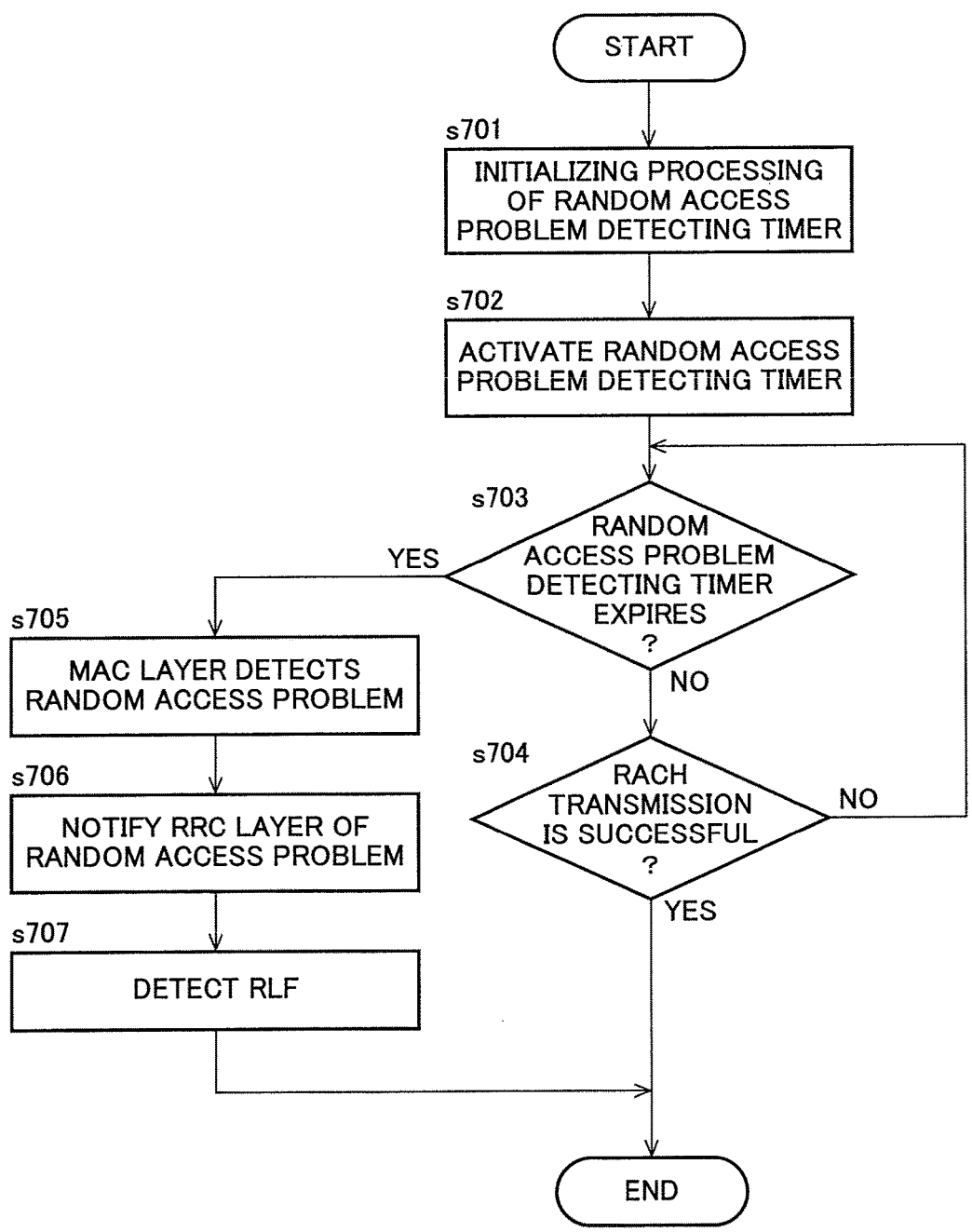
FIG. 11 is a flowchart of general processing for the mobile station apparatus performing the random access problem detection using a timer.

FIG. 11 is a flowchart of a general process of a random access procedure and a random access problem detecting method using and a timer of this embodiment.

First, if the random access problem detecting method using a timer is applied, the mobile station apparatus 100 executes an initializing processing of the random access problem detecting timer (step s701). If the random access channel transmission counter counts the maximum number of transmissions, the timer control portion 140 activates the random access problem detecting timer (step s702). The mobile station apparatus 100 checks whether the random access problem detecting timer reaches the expiration time (step s703). If the random access problem detecting timer is not expired (step s703: NO), the mobile station apparatus 100 checks whether the RACH transmission is successful (step s704). If the RACH transmission is successful (step s704: YES), the mobile station apparatus 100 recognizes that the random access to the base station apparatus 200 is successful, and terminates the random access procedure. The expiration time measured by the random access problem detecting timer may uniquely be determined in the system in advance, may concurrently be supplied as broadcast information from the base station apparatus to the mobile station apparatuses, or may be supplied from the base station apparatus to the individual mobile station apparatuses.

The case that the random access problem detecting timer is expired (step s703: YES) will be described next.

The MAC layer of the mobile station apparatus 100 recognizes that a random access problem is detected (step s705) and notifies the RRC layer, i.e., the higher layer of the MAC layer of the random access problem (step s706). In response to the notification, the RRC layer recognizes that a radio link failure (RLF) is detected for the component carrier (CC) in which the random access problem is detected (step s707). The RRC layer executes a reestablishment processing. For example, the reestablishment processing includes changing a parameter such as a transmission frequency and restarting the random access procedure from step s701.

However, an existing timer may be substituted for the timer to be used or a new timer may be set as a random access problem detecting timer. This existing timer is a timer set to application/purpose other than measuring a transmission time of the random access channel. For example, a radio link failure detecting timer may be used as the random access problem detecting timer. The information thereof may uniquely be determined in the system in advance, may concurrently be supplied as broadcast information from the base station apparatus to the mobile station apparatuses, or may be supplied from the base station apparatus to the individual mobile station apparatuses.

The random access problem detecting times of the random access problem detecting timers set to CCs may be the same or different.

In the sixth embodiment, the random access problem detecting timer can give an extension time for performing the RACH transmission in another CC rather than releasing all the CCs allocated to the base station apparatus on the assumption that the CCs have RLF immediately after the random access channel transmission counter reaches the maximum number of transmissions. If the RACH transmission succeeds during the extension time, the random access between the mobile station apparatus and the base station apparatus is completed.

A portion of the functions of the base station apparatus and the mobile station apparatus in the embodiments may be implemented by a computer. In this case, a program for implementing the control function may be recorded in a computer readable recording medium and the program recorded in this recording medium may be read and executed by a computer system to implement the function. A "computer system" as used herein is assumed to include OS and hardware such as peripherals. A "computer readable recording medium" means a portable medium such as a flexible disk, a magnetic optical disk, ROM, or CD-ROM, and a storage device such as a hard disk built into a computer system. A "computer readable recording medium" may include those dynamically retaining a program for a short time like communication wires when a program is transmitted through a network such as the internet and a communication line such as a telephone line, and those retaining a program for a certain time like a volatile memory within a computer system acting as a server or a client in such a case. The program may be for the purpose of implementing a portion of the functions and may be a program capable of implementing the functions in combination with a program already recorded in a computer system.

A portion or whole of the mobile station apparatus and the base station apparatus in the embodiments may be realized by LSI (Large Scale Integration) that is typically an integrated circuit. The functional blocks of the mobile station apparatus and the base station apparatus may individually be formed as chips, or a portion or all of the functional blocks may be integrated into a chip. A technique of forming an integrated circuit may be realized not only in LSI but also in a dedicated circuit or a general purpose processor. If advance in semiconductor technology leads to emergence of a technique of forming an integrated circuit alternative to LSI, the integrated circuit from the technique is also usable.

Although the embodiments have been described in terms of a mobile communication system including a base station apparatus and a mobile station apparatus, the present invention is applicable to a fixed radio communication system. In this case, a system is made up of a fixed radio apparatus having the same function as the base station apparatus and a fixed radio apparatus having the same function as the mobile station apparatus.

Although the embodiments of the present invention have been described in detail with reference to the drawings, specific configurations are not limited to the embodiments and the claims include designs etc., within a range not departing from the spirit of the present invention.

EXPLANATIONS OF REFERENCE NUMERALS

100 . . . mobile station apparatus; 101 . . . data control portion; 102 . . . demodulating portion; 103 . . . radio transmitting portion; 104 . . . radio receiving portion; 105 . . . demodulating portion; 106 . . . data extracting portion; 107 . . . antenna; 108 . . . timer portion; 109 . . . counter portion; 110 . . . transmitting portion; 111 . . . RACH generating portion; 120 . . . receiving portion; 130 . . . scheduling portion; 140 . . . timer control portion; 150 . . . counter control portion; 160 . . . transmission information control portion; 200 . . . base station apparatus; 201 . . . data control portion; 202 . . . demodulating portion; 203 . . . radio transmitting portion; 204 . . . radio receiving portion; 205 . . . demodulating portion; 206 . . . data extracting portion; 207 . . . antenna; 208 . . . timer portion; 209 . . . counter portion; 210 . . . transmitting portion; 211 . . . RAR message generating portion; 212 . . . RACH detecting portion; 220 . . . receiving portion; 230 . . . scheduling portion; 240 . . . timer control portion; 250 . . . counter control portion; and 260 . . . transmission information control portion.

The invention claimed is:

1. A terminal device comprising:
a transmitter configured to transmit a first random access preamble;
a higher layer processor configured to configure, based on a higher layer signal, a first identity corresponding to a first component carrier group and a second identity corresponding to a second component carrier group different from the first component carrier group;
a counter configured to, in a case that two or more component carriers are configured for an uplink, count, for each component carrier, a number of times the first random access preamble has been transmitted; and
a medium access control (MAC) layer processor configured to
in a first case that the number of times counted exceeds a maximum number on a first master component carrier of the first component carrier group or a second master component carrier of the second component carrier group, indicate a random access problem to an upper layer and attempt to retransmit the first random access preamble using a first secondary component carrier of the two or more component carriers excluding the first master component carrier and the second master component carrier,
in a second case that the number of times counted exceeds the maximum number on any secondary component carrier of the two or more component carriers, select a second random access preamble different from the first random access preamble, wherein
the random access problem is defined as that no random access response to the random access preamble transmission is successfully received.

2. The terminal device according to claim 1, wherein the higher layer processor is configured to start a timer in a case that a condition associated with a radio link failure is met.

3. A random access problem detecting method for a terminal device, the random access problem detecting method comprising:
transmitting a first random access preamble;
configuring, based on a higher layer signal, a first identity corresponding to a first component carrier group and a second identity corresponding to a second component carrier group different from the first component carrier group;
in a case that two or more component carriers are configured for an uplink, counting, for each component carrier, a number of times the first random access preamble has been transmitted; and
in a first case that the number of times counted exceeds a maximum number on a first master component carrier of the first component carrier group or a second master component carrier of the second component carrier group, indicating a random access problem to an upper layer and attempting to retransmit the first random access preamble using a first secondary component carrier of the two or more component carriers excluding the first master component carrier and the second master component carrier; and in a second case that the number of times counted exceeds the maximum number on any secondary component carrier of the two or more component carriers, selecting a second random access preamble different from the first random access preamble, wherein the random access problem is defined as that no random access response to the random access preamble transmission is successfully received.

4. The random access problem detecting method according to claim 3, further comprising:

starting a timer in a case that a condition associated with a radio link failure is met.

* * * * *